United States Patent [19]

Byram et al.

[11] Patent Number: 5,233,882
[45] Date of Patent: Aug. 10, 1993

[54] REMOTE CONTROL LEVER MODULE

[75] Inventors: Robert J. Byram, Grand Blanc; Bryan S. Kikta, Davison, both of Mich.; Kevin R. Keegan, Hilton, N.Y.; Daniel F. Smith, Conesus, N.Y.; Donald G. Witzel, Fairport, N.Y.; Daniel A. Crawford, Flint, Mich.; Steven A. Kornburger, Davisburg, Mich.; Lisa M. Unuvar, Flint, Mich.

[73] Assignee: General Motors Corporation, Detroit, Mich.

[21] Appl. No.: 692,375

[22] Filed: Apr. 26, 1991

Related U.S. Application Data

[63] Continuation-in-part of Ser. No. 552,173, Jul. 12, 1990, abandoned.

[51] Int. Cl.$^5$ .................................................. G05G 1/14
[52] U.S. Cl. ........................................ 74/514; 74/512; 74/560; 123/399; 192/1.56; 307/10.1
[58] Field of Search ............... 307/10.1; 74/512–514, 74/560; 123/399, 361; 340/453; 192/1.56, 1.43, 8 C; 180/335; 73/118.1, 116; 338/32 R

[56] References Cited

U.S. PATENT DOCUMENTS

| | | | |
|---|---|---|---|
| 3,695,379 | 10/1972 | Veilleux | 180/103 |
| 3,702,458 | 11/1972 | Capachietti, Sr. et al. | 340/52 |
| 3,757,758 | 9/1973 | Stoltman | 123/198 |
| 3,958,677 | 5/1976 | Spanelis | 192/3 R |
| 4,006,402 | 2/1977 | Mincuzzi | 323/94 |
| 4,088,977 | 5/1978 | Bowman, Jr. et al. | 338/32 |
| 4,117,401 | 9/1978 | Glauert | 324/208 |
| 4,132,970 | 1/1979 | Masuda et al. | 338/32 R |
| 4,392,375 | 7/1983 | Osamu et al. | 73/118 |
| 4,519,360 | 5/1985 | Murakami | 123/399 |
| 4,528,590 | 7/1985 | Bisacquino et al. | 338/153 |
| 4,566,418 | 1/1986 | Yamamoto et al. | 123/479 |
| 4,601,271 | 7/1986 | Ejiri et al. | 123/361 |
| 4,603,675 | 8/1986 | Junginger et al. | 123/478 |
| 4,616,504 | 10/1986 | Overcash et al. | 73/118.1 |
| 4,640,248 | 2/1987 | Stoltman | 423/399 |
| 4,733,214 | 3/1988 | Andresen | 338/128 |
| 4,853,556 | 8/1989 | Pfalzgraf et al. | 307/10.1 |
| 4,869,220 | 9/1989 | Imoehl | 123/399 |
| 4,883,037 | 11/1989 | Mabee et al. | 123/399 |
| 4,942,949 | 7/1990 | Dai | 192/1.32 |
| 4,944,269 | 7/1990 | Imoehl | 123/399 |
| 4,958,607 | 9/1990 | Lundberg | 123/399 |
| 4,976,166 | 12/1990 | Davis et al. | 74/512 |
| 5,013,930 | 5/1991 | Spakowski et al. | 307/10.1 |
| 5,161,422 | 11/1992 | Suman et al. | 307/10.1 X |

FOREIGN PATENT DOCUMENTS

| | | | |
|---|---|---|---|
| 872180 | 6/1942 | France . | |
| 1452516 | 9/1966 | France | 74/56.1 |
| 0116325 | 5/1978 | Japan | 192/8 C |
| 60-45729 | 3/1985 | Japan . | |
| WO 91/04400 | 4/1991 | PCT Int'l Appl. . | |

OTHER PUBLICATIONS

US 4735183A abstract.
US 4781162A abstract.
US 4791902A abstract.
(List continued on next page.)

Primary Examiner—Vinh T. Luong
Attorney, Agent, or Firm—Gordon F. Belcher; C. K. Veenstra

[57] ABSTRACT

A remote control lever module comprises an inner shaft coaxially located inside an outer shaft. The inner and outer shafts are rotatably mounted on a support and can rotate with respect to one another. A return mechanism is engageable with the inner and outer shafts enabling forward rotation of the inner shaft to cause forward rotation of the outer shaft. The return mechanism further enables extended forward rotation of the inner shaft with respect to the outer shaft, and urges backward rotation of the inner shaft to a rearmost position. The return mechanism limits backward rotation of the inner and outer shafts beyond a nonactuating position. A force spring urges the outer shaft to the nonactuating position. Sensors produce electrical signals proportional to the angular position of the inner and outer shafts. A friction pad can be disposed between the inner shaft and support to frictionally resist rotation of the inner shaft with respect to the support.

22 Claims, 8 Drawing Sheets

OTHER PUBLICATIONS

US 4809659A abstract.
US 4854283A abstract.
US 4915074A abstract.
US 4919096A abstract.
US 4919097A abstract.
DE 3836507A abstract.
DE 3913609A abstract.
EP 126880B abstract.
EP 176967B abstract.
EP 198312B abstract.
EP 250873A synopsis.
EP 262883A abstract.
EP 279375A abstract.
EP 289766A abstract.
EP 344772A abstract.
WO 8806234A abstract.
WO 8806235A abstract.
Roger Bloomfield, AC Rochester letter with colored annotations, Ref: Electronic Pedal Module Project, Jan. 21, 1992, 1 page.
Bosch, figure from a page, on microfiche, of a service manual for a 1990 or 1991 BMW 735i or 750i vehicle, 1 page.
Yoshiaki Danno et al., "Powertrain Control by DBW System-Strategy and Modeling," No. 890760, p. 92, 93 of 85-98.
"E-Gas 1st Generation for Commercial Vehicles", VDO S46-TR/SF., 1977-1981, p. 1-3 of 16 pages.
European patent application No. 90302674.8 (counterpart of U.S. Pat. No. 5,013,930), publication No. 0390353A1, publication date Mar. 10, 1990, 13 pages.
European Patent Office search report for European patent application No. 90302674.8, dated "Jul. 19, 1990", date of search Jun. 27, 1990, 3 pages.
European Patent Office examination of European patent application No. 90302674.8, dated May 2, 1992, 4 pages.
Lou Fierens, "Williams Controls, Precision Controls Division", Dana Corporation, Apr. 26, 1991 p. 3-7 of 7 pages.
"Product Data, Fueling Components; Lucas Engine Management Systems", Lucas Automotive, 1989, p. 2 of 8 pages.
Bob Nagy, "BMW 750iL V-12, A dozen good reasons for aspiring to affluence", Motor Trend, Nov. 1987, p. 76 of pp. 74-77.
Neuss, "Technical description of the E-gas system (Drive by Wire-System)", Pierburg GMBH, Jun. 9, 1987 p. 1-4, 9-13, 17 of 17 pages.
A. J. Petersen, "The Magnetroresistive Sensor, a versatile device for transducers", Philips Electrical Components and Materials Division of Amperex Electronic Corporation, 1984, 2 pages.
"Sensor Developments" with colored annotations, Automotive Engineering, vol. 100, No 3, Mar. 1992, pp. 29-31 (see p. 29, A patent application has been filed . . . ).
David Schmeling, AC Rochester Memorandum, Date: Sep. 14, 1990, Subject: Electronic Throttle Control Files, 1 page.
attachment-Electronic Throttle Control Competitor File Listing, 1 page.
attachment-ETC File Reference List, 7 pages.
D. F. Smith, Rochester Products Division Inter-organization Letter, Date: Dec. 7, 1987, Subject: "Drive By Wire-BOSCH/BMW 750 iL", 1 page.
attachment-Carlos Franca, "BMW 750iL Production Drive By Wire System; 5.0 Liter V-12; Available in Europe Now: Expected in U.S. By Mid 1988", p. 2, 4, 5, 8-12, 14, 17 of 17 pages.
"The BMW 750 With New 5 Ltr. V 12 Light Allow Engine", Document Transmission Format, reporting date: Mar. 9, 1987, pp. 7, 8, 19, 20, 26 of 26 pages.

REMOTE CONTROL LEVER MODULE

This application is a continuation-in-part of application Ser. No. 552173, filed, Jul. 12, 1990 entitled "REMOTE CONTROL LEVER MODULE", now abandoned.

BACKGROUND OF THE INVENTION

1. Technical Field

This invention relates to a remote control lever module for sensing movement of a lever. More particularly, the invention relates to a remote control lever module for sensing the angular position of a pedal lever for an electronic vehicle control system. The lever module may be further adapted to include hysteresis to simulate the feel of a purely mechanical linkage (i.e., a pedal lever connected to a throttle valve via a cable), and to sense engagement of the pedal lever by the operator.

2. Background Art

Vehicle engine control systems are known having a sensor, such as a potentiometer, connected to an accelerator pedal for measuring the displacement of the accelerator pedal. A force sensor, such as a resistive strain gauge, is connected to the accelerator pedal which is able to sense whether a force is being applied to the pedal, such as by the operator stepping thereon. The electronic control module (ECM) is programmed to sense the signal produced by the force sensor and cause the engine to idle if there is no force sensed, even if the potentiometer indicates displacement of the pedal. This reduces the possibility of unintended movement of the vehicle by a reason other than the operator stepping on the accelerator pedal.

Such vehicle engine control systems can require considerable effort to package and install in a vehicle since they require multiple connections to the pedal and a portion of the vehicle which is stationary with respect to the vehicle, such as the bulkhead. Also, the potentiometer can vary in size as the pedal is displaced, and can be located apart from the force sensor further complicating packaging of the system.

An accelerator control apparatus is also known including a single shaft which rotates in proportion to the displacement of an accelerator pedal. The shaft is coupled to a position sensor which measures the rotation of the shaft. The shaft is also linked to a pedal sensor switch which is opened and closed by movement of the shaft corresponding to initial displacement of the undepressed pedal and return of the displaced pedal to the undisplaced position. A comparison of the signals from the position sensor and pedal sensor can indicate the integrity of the apparatus. The apparatus can also include a dual coiled return spring having coils of approximately the same size. The single shaft and limited number of return spring coils can limit the sensitivity of the apparatus to external forces applied to the pedal.

An accelerating pedal is also known including a single shaft which rotates in proportion to the displacement of the pedal. The shaft can be coupled to a position sensor which measures the rotation of the shaft. The shaft includes a disk which rotates therewith. The disk fits between pads which are fixed to a housing within which the shaft rotates When the shaft rotates, the pads exert a frictional force on the disk to create a desired hysteresis effect. The surface of the pads which engage the disk, as well as the surfaces of the disk which engage the pad, must be finished to produce the desired hysteresis effect yet enable the return spring to backwardly rotate the shaft when the operator ceases to depress the pedal. This can limit the permissible variations in surface finishes of the disk and pads.

SUMMARY OF THE INVENTION

The present invention provides a remote control lever module for sensing the angular position of a lever. Such control lever modules are particularly suited for use in electronic vehicle control systems for sensing the angular position and actuation of a pedal lever.

The remote control lever module comprises an inner shaft coaxially located inside an outer shaft enabling relative rotation between the shafts. The outer shaft has an outer shaft stop engageable with the inner shaft to limit backward rotation of the inner shaft with respect to the outer shaft. A return means is engageable with the inner and outer shafts enabling forward rotation of the inner shaft to cause forward rotation of the outer shaft. The return means further enables forward rotation of the inner shaft away from a rearmost position, and urges the inner shaft to the rearmost position when the inner shaft has forwardly rotated away from the rearmost position. The return means limits backward rotation of the inner and outer shafts beyond a nonactuating position A force spring urges the outer shaft to the nonactuating position when the outer shaft is forwardly rotated away from the nonactuating position. Sensors produce electrical signals proportional to the angular position of the inner and outer shafts with respect to the support means.

The transmission of rotation from the inner shaft to the outer shaft, and the capability to sense the rotation of the inner and outer shaft means, via the inner and outer shaft sensors, enables sensing of the condition of the return spring, force spring, outer shaft bearing and intermediate bearing. This is due to the initial rotation of the inner shaft ordinarily producing rotation of the outer shaft. Also, when the outer shaft is at the nonactuated position, the inner shaft should be at the same position. Any deviations from these conditions can indicate that an examination of the lever module is warranted.

The lever module may also include a friction pad disposed between the inner shaft and a support member which is fixed to the support means during at least a portion of the rotation of the inner shaft. The friction pad has a first friction surface in engagement with the inner shaft to frictionally resist relative displacement between the friction pad and inner shaft. The friction pad has a second friction surface in engagement with the support member to frictionally resist relative displacement between the friction pad and support member The frictional resistance provided by the first and second friction surfaces provides a desired hysteresis effect. Also, the first and second friction surfaces can each separately permit relative rotation between the inner shaft and support means, independently of the other friction surface.

These and other features and advantages of the invention will be more fully understood from the following description of certain specific embodiments of the invention taken together with the accompanying drawings.

BRIEF DESCRIPTION OF THE DRAWINGS

In the drawings.

Corresponding reference characters indicate corresponding parts throughout the several views of the drawings.

DESCRIPTION OF THE PREFERRED EMBODIMENTS

Referring now to the drawings in detail, numeral 10 generally indicates a remote control lever module of the present invention. The lever module 10 comprises a lever including an inner shaft 12, and an actuating arm 14 extending from the inner shaft at an angle thereto. A pedal 16 is connected to the actuating arm 14.

An intermediate bearing 18 coaxially surrounds a portion of the inner shaft 12. An outer shaft 20 coaxially surrounds a portion of the intermediate bearing 18 enabling relative rotation between the inner and outer shafts 12,20. The outer shaft 20 has an outer shaft stop 22 engageable with the inner shaft 12 to limit backward rotation, indicated by numeral 23, of the inner shaft 12 with respect to the outer shaft when the inner shaft engages the outer shaft stop thereby defining a rearmost position A support means 24 includes an inner shaft bearing 25 which pivotably supports the inner shaft 12 so that, displacement of the actuating arm 14 causes the inner shaft 12 to rotate in a forward direction, indicated by numeral 26, or in a backward direction 23 about its axis. Displacement of the actuating arm 14 can be produced by the operator depressing the pedal 16 or releasing a depressed pedal. An outer shaft bearing 28 pivotably supports the outer shaft 20 enabling the outer shaft to forwardly or backwardly rotate 26,23 about its axis.

A return means 30 is engageable with the inner and outer shafts 12,20 enabling forward rotation 26 of the inner shaft to cause forward rotation of the outer shaft. The return means 30 further enables forward rotation 26 of the inner shaft 12 to cause forward rotation of the inner shaft away from the rearmost position. The return means 30 also urges the inner shaft 12 toward the rearmost position when the inner shaft has forwardly rotated 26 away from the rearmost position. The return means 30 limits backward rotation 23 of the outer shaft 20 beyond a nonactuating position, with the engagement between the inner shaft 12 and outer shaft stop 22 limiting backward rotation 23 of the inner shaft beyond the nonactuating position.

A force spring 32 has one end anchored to the outer shaft 20 and another end anchored to the support means 24. The force spring 32 urges the outer shaft 20 toward the nonactuating position when the outer shaft has forwardly rotated 26 away from the nonactuating position. The force spring 32 is sufficiently yielding so that rotation of the inner shaft 12 causes rotation of the outer shaft 20.

An inner shaft sensor 34 is connected to the support means 24 and is adapted to produce an electrical signal proportional to the angular displacement of the inner shaft 12 with respect to the support means. An outer shaft sensor 36 is connected to the support means 24 and is adapted to produce an electrical signal proportional to the angular displacement of the outer shaft 20 with respect to the support means.

More specifically, the inner shaft 12 includes a cylindrical inner shaft axle 38 with one end having a double D configuration in cross section for attachment of the actuating arm 14 thereto. The one end of the inner shaft axle 38 may also have screw threads. The other end of the inner shaft axle 38 also has a double D configuration in cross section for engagement with the inner shaft sensor 34. The inner shaft axle 38 has a flat 40 on its outer surface.

The inner shaft 12 includes an inner shaft collar 42 having an annular flange portion 44 press fitted to the inner shaft axle 38. The inner shaft collar 42 has a flat 46 on its inner surface which engages the flat 40 on the inner shaft axle 38 so that the inner shaft axle and inner shaft collar have a predetermined angular alignment with respect to one another. The inner shaft collar 42 has a cylindrical spacer portion 48 depending from the flange portion 44. The inner shaft collar 42 has an inner shaft stop 50 comprising an arcuate inner tab depending from the spacer portion 48. The inner shaft stop 50 defines a 180 degree arc. A longitudinal slot 51 extends through the inner shaft stop 50 and spacer portion 48. The longitudinal slot 51 is located midway between the ends of the inner shaft stop 50. The inner shaft collar 42 also has a cylindrical axle portion 49 depending from the flange portion 44 and press fitted onto the inner shaft axle 38. The axle portion 49 has an annular cross section which is uniform along its length. The flange portion 44 and axle portion 49 may also be molded with the inner shaft axle 38 as a single integral unit.

The intermediate bearing 18 is cylindrical and can be formed from a variety of materials that reduce friction caused by sliding contact between two surfaces. One such material is a thermoset plastic comprising 43% graphite, 20% phenolic with the remaining 37% comprising illite, talc, zincite and carbon.

The outer shaft 20 includes a cylindrical outer shaft axle 53 with a hollow interior to fit over the intermediate bearing 18. The outer shaft axle 53 has a flat 52 on its outer surface. One end of the outer shaft axle 53 has diametrically opposed longitudinal prongs 54 extending therefrom for engagement with outer shaft sensor 36.

The outer shaft 20 includes an outer shaft collar 56 having an annular flange portion 58 press fitted thereto. The inner surface of the outer shaft collar 56 has a flat 61 which the flat 52 on the outer shaft axle 53 engages so that the outer shaft axle and outer shaft collar have a predetermined angular alignment with respect to one another. The outer shaft collar 56 has a cylindrical spacer portion 60 extending upward from the flange portion 58. The spacer portion 60 is also press fitted to the outer shaft axle 53. The flange portion 58 and spacer portion 60 may also be molded with the outer shaft axle 53 as a single integral unit.

The outer shaft stop 22 comprises an arcuate tab portion extending upward from the spacer portion 60 of the outer shaft collar 56. The outer shaft stop 22 defines a 154 degree arc. A longitudinal slot 62 is located 80 degrees from one end of the outer shaft stop 22 in the spacer portion 60.

The outer and inner shaft stops 22,50 mesh together so that they are contained in the same radial plane with respect to the inner and outer shaft axles 38,53. Since the total arc length of the outer and inner shaft stops 22,50 is 334 degrees, there is 26 degrees of rotational play between the inner and outer shafts 12,20. The maximum backward rotation 23 of the inner shaft 12, with respect to the outer shaft 20, is limited by the engagement of one end of the outer shaft stop 22 with one end of the inner shaft stop 50 and defines the rearmost position. The maximum forward rotation 26 of the inner shaft 12, with respect to the outer shaft 20, is limited by the engagement of the other end of the outer shaft stop 22 with the other end of the inner shaft stop 50 and defines the foremost position.

The return means 30 includes a return stop 63 comprising an arcuate tab portion depending from the flange portion 58 in the opposite direction from the spacer portion 60. The return stop 63 defines a 60 degree arc and is spaced 33.25 degrees from one end of the outer shaft stop 22. A longitudinal slot 64 is located midway between the ends of the return stop 63.

The support means 24 comprises a metallic support housing 65 having a cylindrical interior with circular openings at each end. A cover 66 is disposed over one end of the support housing 65 with the support housing being crimped over the cover to prevent removal of the cover therefrom. The support housing 65 has a support flange 68 parallel to the plane of the cover 66. The support flange 68 has three mounting holes for mounting the support housing 65 to a vehicle so that the support housing is stationary with respect to the seat of the operator.

The inner and outer shaft axles 38,53, and the inner and outer shaft collars 42,56 are located in the support housing 65. The inner shaft bearing 25 is disposed between the inner shaft axle 38 and support housing 65, and comprises a ball bearing.

The outer shaft bearing 28 is cylindrical and disposed between the outer shaft axle 53 and support housing 65. The outer shaft bearing 28 can be formed from a variety of materials that reduce friction caused by sliding contact between two surfaces One such material is a thermoset plastic comprising 43% graphite, 20% phenolic with the remaining 37% comprising illite, talc, zincite and carbon.

The end of the support housing 65 adjacent the outer shaft bearing 28 has inner and outer annular bosses 70,72 formed thereon. The longitudinal dimension of the inner boss 70 is less than the outer boss 72. The outer boss 72 has a radial slot 74.

Figures 4, 5, 6:
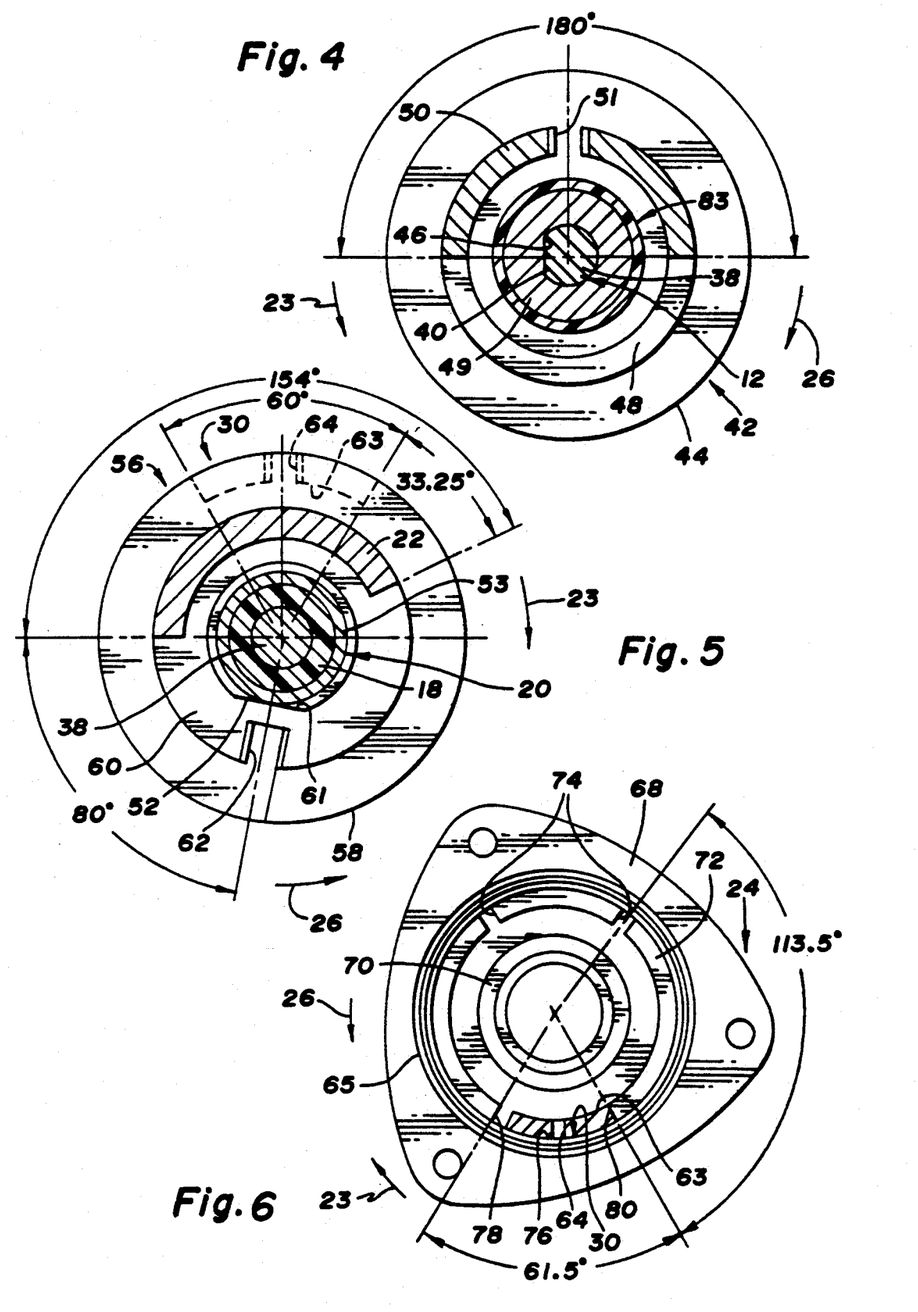
FIG. 4 is a cross sectional view of the lever module generally in the plane indicated by the line 4—4 of FIG. 3 showing the inner shaft collar.
FIG. 5 is a cross sectional view of the lever module generally in the plane indicated by the line 5—5 of FIG. 3 showing the outer shaft collar.
FIG. 6 is a view of the lever module generally in the plane indicated by the line 6—6 of FIG. 3 showing the support housing with the parts, other than the return stop, being removed from it.

The return means 30 comprises a return recess 76 formed in the outer boss 72. The return recess 76 has one end located 113.5 degrees from the radial slot 74, and defines a 61.5 degree arc, as shown in FIG. 6. The return stop 63 extends into the return recess 76 so that 1.5 degrees of rotational play is allowed between the return stop and support housing 65.

Backward rotation 23 of the outer shaft 20, with respect to the support housing 65, is limited by engagement of the return stop 63 with the rear end of the return recess 76 which constitutes a rear stop 78. The nonactuating position is defined by the angular position of the outer shaft 20 when the return stop 63 engages the rear stop 78 of the return recess 76. Forward rotation 26 of the outer shaft 20, with respect to the support housing 65, is limited by engagement of the return stop 63 with the front end of the return recess 76 which constitutes the front stop 80. The actuating position is defined by the angular position of the outer shaft 20 when the return stop 63 engages the front stop 80 of the return recess 76.

The return means 30 further includes a return spring 82 which may comprise a double coil helical or torsion spring. Each coil of the return spring 82 has a tang at one end which is inserted into the slot 51 in the inner shaft collar 42 to anchor the return spring to the inner shaft 12. The other end of each coil of the return spring 82 also has a tang which is inserted into the slot 62 in the outer shaft collar 56 to anchor the return spring to the outer shaft 20. The return spring 82 encircles the spacer portions 48,60 when anchored to the inner and outer shaft collars 42,56. The return spring 82 urges forward rotation 26 of the outer shaft 20 when the inner shaft 12 is forwardly rotated. The return spring 82 is sufficiently yielding so that, when the outer shaft 20 is in the actuating position, the return spring allows forward rotation 26 of the inner shaft 12 away from the rearmost position. The return spring 82 acts on the inner shaft 12 when it has forwardly rotated 26 away from the rearmost position to urge the inner shaft toward the rearmost position.

The return spring 82 preferably comprises a pair of spirally wound flat strip springs each having an inner and outer tang. The inner tangs are inserted into the slot 51 in the inner shaft collar 42. The outer tangs are hook-shaped in order to catch a tang member fixed to the flange portion 58 of the outer shaft collar 56. The tang member extends toward the flange portion 44 of the inner shaft collar 42 and is disposed between the two flange portions 44,58. The flat strip springs encircle the spacer portion 48 of the inner shaft collar 42. The flat strip springs act on the inner and outer shafts 12,20 in a similar manner as the return springs 82.

One end of the force spring 32 has a tang which is inserted into the slot 64 in the return stop 63 to anchor the force spring to the outer shaft 20. The other end of the force spring 32 has a tang which is inserted into the slot 74 in the outer boss 74 to anchor the force spring to the support housing 65. The force spring 32 is disposed between the inner and outer bosses 70,72 when anchored to the outer shaft 20 and support housing 65. The stiffness of the force spring 32 is substantially less than the stiffness of the return spring 82.

It is possible to reverse the orientation of the slots 51,62,64,74 so that the direction of forward and backward rotation 26,23 of the inner and outer shafts 12,20 with respect to the support housing 65 is reversed. The support housing 65 has a second slot 74 in which the tang at the other end of the force spring 32 is inserted to facilitate such reversal.

The axle portion 49 of the inner shaft collar 42, and the outer shaft axle 53 are coaxially positioned end-to-end. A friction pad comprising a friction collar 83 includes a sleeve 84 formed of thermoplastic comprising an ETFE (ethylene tetrafluoroethylene) fluoropolymer with 10% glass. The sleeve 84 has a first friction surface which coaxially surrounds and engages the end of the outer shaft axle 53 adjacent to the axle portion 49. The sleeve 84 has a second friction surface which coaxially surrounds and engages the end of the axle portion 49 adjacent to the outer shaft axle 53.

Resilient collar rings 86 fit in grooves in the sleeve 84 to coaxially surround the sleeve. The collar rings 86 radially compress the sleeve 84 to cause the sleeve to grip the axle portion 49 and outer shaft axle 53. This results in the first friction surface frictionally resisting relative displacement between the sleeve 84 and outer shaft axle 53, and the second friction surface frictionally resisting relative displacement between the sleeve 84 and axle portion 49. The sleeve 84 thereby frictionally resists relative rotation between the inner and outer shafts 12,20.

It is possible for the second friction surface of the sleeve 84 to engage a support member other than the outer shaft axle 53, so long as the support member is fixed with respect to the support housing 65 during at least a portion of the rotation of the inner shaft 12. Such a support member could have an annular shape and extend from the support housing 65 in a coaxial orientation with respect to the inner shaft axle 38. It is also possible for the second friction surface of the sleeve 84 to directly engage the support housing 65.

A sensor housing 88 contains the inner and outer shaft sensors 34,36. The sensor housing 88 is bolted to the end of the support housing 65 opposite the cover 66 so that the ends of the inner and outer shaft axles 38,53 extend out of the support housing into the sensor housing to engage the inner and outer shaft sensors 34,36.

The outer shaft sensor 36 includes an annular member with diametrically opposed slots into which the prongs on the outer shaft axle 53 are inserted. Rotation of the outer shaft 20 causes the prongs 54 to engage the slots and cause the annular member to concomitantly rotate. The outer shaft sensor 36 includes an outer shaft sensor element which is connected to the annular member and thereby concomitantly rotates with the outer shaft 20. The outer shaft sensor element produces an electrical force signal proportional to the rotation of the annular member (which equals the rotation of the outer shaft 20) with respect to the support housing 65. The force signal produced when the outer shaft 20 is in the nonactuating position constitutes the nonactuating signal, and the force signal produced when the outer shaft is forwardly rotated 26 away from the nonactuating position constitutes the actuating signal. The force signal produced by the outer shaft sensor element preferably has an inversed polarity wherein its voltage output decreases as the outer shaft 20 forwardly rotates 26.

Figure 7:
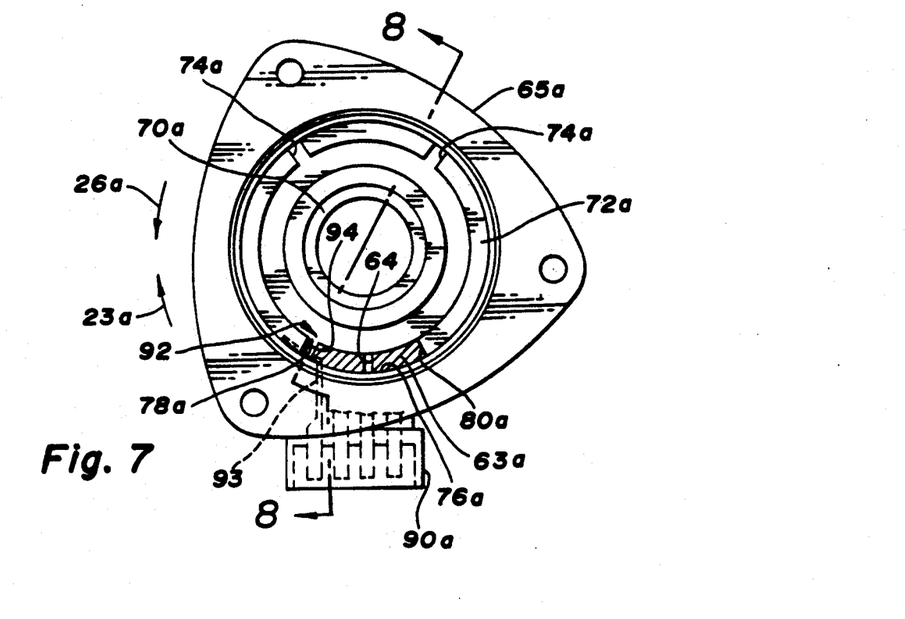
FIG. 7 is a view corresponding to FIG. 6 showing a second of the switch.
Figure 8:
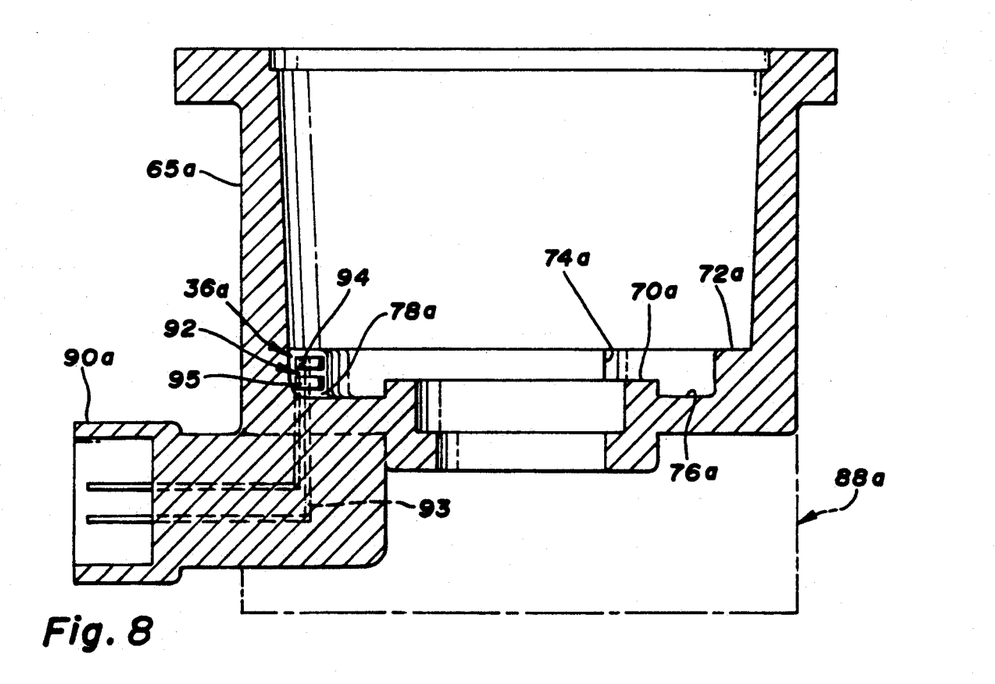
FIG. 8 is a sectional view of FIG. 7 in a plane corresponding to the plane indicated by the line 8—8 of FIG. 6 showing the second embodiment of the switch.

The outer shaft sensor 36a may alternatively comprise a switch 92 mounted on the rear stop 78a, as shown in FIGS. 7 and 8. Parts similar to those shown in FIGS. 1-6 have the same reference numeral with the addition of the suffix a. In this embodiment, the support housing 65a and sensor housing 88a are constituted by a single integral piece and plastic. The force switch 92 comprises first and second electrical contacts 94,95 comprising resilient conductive precision stampings which extend away from the rear stop 78a. The first and second electrical contacts 94,95 are insert molded into the rear stop 78a. The first and second contacts 94,95 are preferably formed from beryllium-copper and may be alternatively formed from phospher-bronze. switch leads 93 extend from the first and second contacts 94,95 through the support housing 65a and into the sensor housing 88a. The plastic material of which the support housing 65a and sensor housing 88a is formed results in the first and second contacts 94,95 and switch leads 93 being electrically isolated from one another.

The first contact 94 is resilient and extends further away from the rear stop 78a than the second contact 95 so that when the outer shaft 20a backwardly rotates 23 toward the rear stop 78a, the return stop 63a initially engages the first contact causing it to deflect. The first contact 94 is sufficiently stiff to considerably reduce the angular velocity of the return stop 63a thereby reducing the impact force of the return stop against the second contact 95. This can result in the first contact 94 being stiffer than the second contact 95.

The resiliency of the first contact 94 enables the outer shaft 20a to backwardly rotate 23 further into engagement with the second contact 95 so that the return stop 63a engages the first and second contacts 94,95 when the outer shaft is in the nonactuating position. Thus, the switch 92 is sandwiched between the rear stop 78a and the return stop 63a when the outer shaft 20a is in the nonactuating position.

The portion of the return stop 63a which engages the first and second contacts 94,95 is electrically conductive so that contact between them enables an electrical current to flow between the first and second contacts via the return stop to produce the nonactuating signal. Thus, the sandwiching results in the switch 92 producing the nonactuating signal.

The electrical current flow is interrupted when the outer shaft 20a is in the actuating position wherein the return stop 63a is disengaged from the first and second contacts 94,95. This causes the switch 92 to produce the actuating signal.

Figure 1:
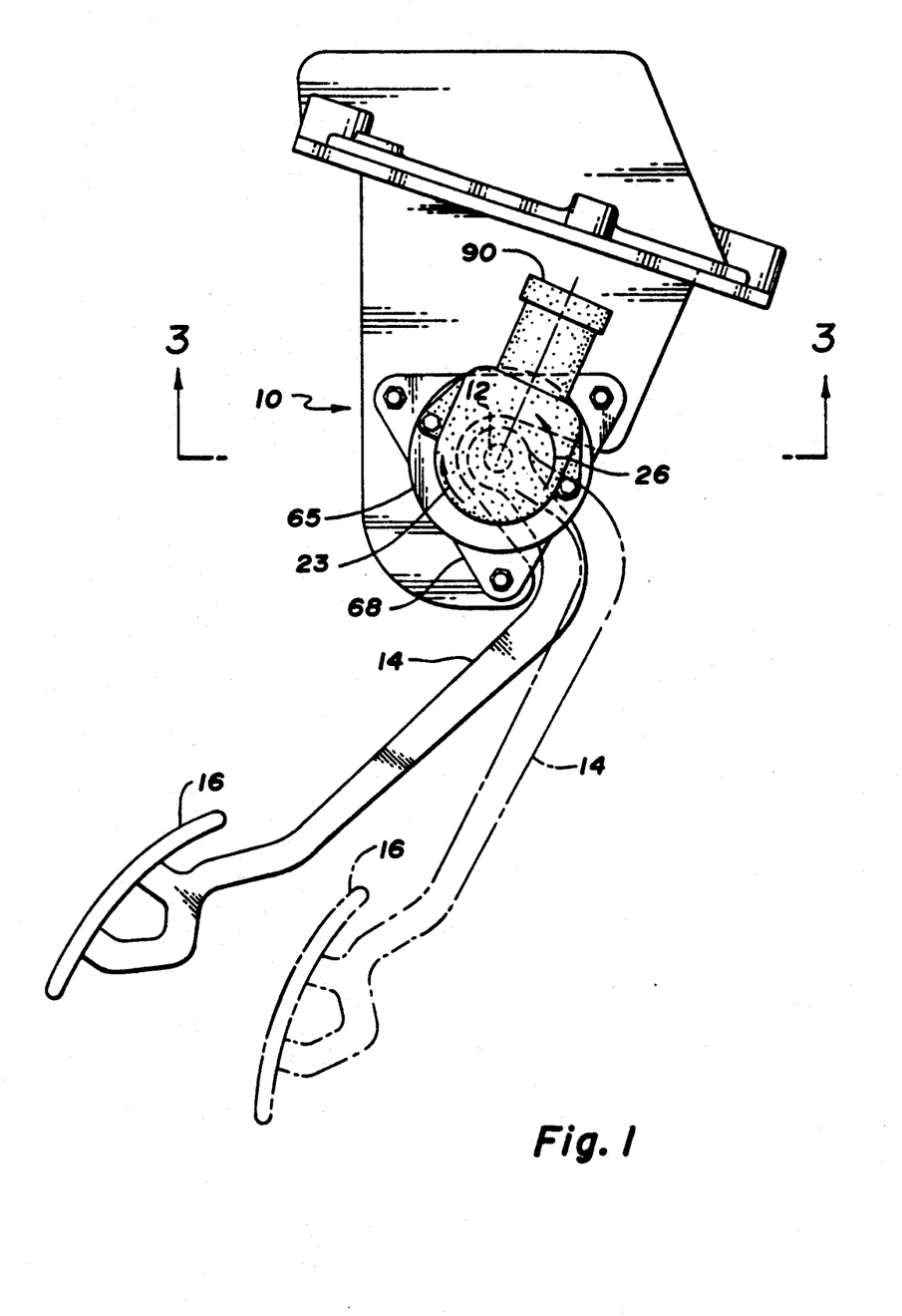
FIG. 1 is a side elevational view of the remote control lever module connected to a pedal and vehicle.
Figure 2:
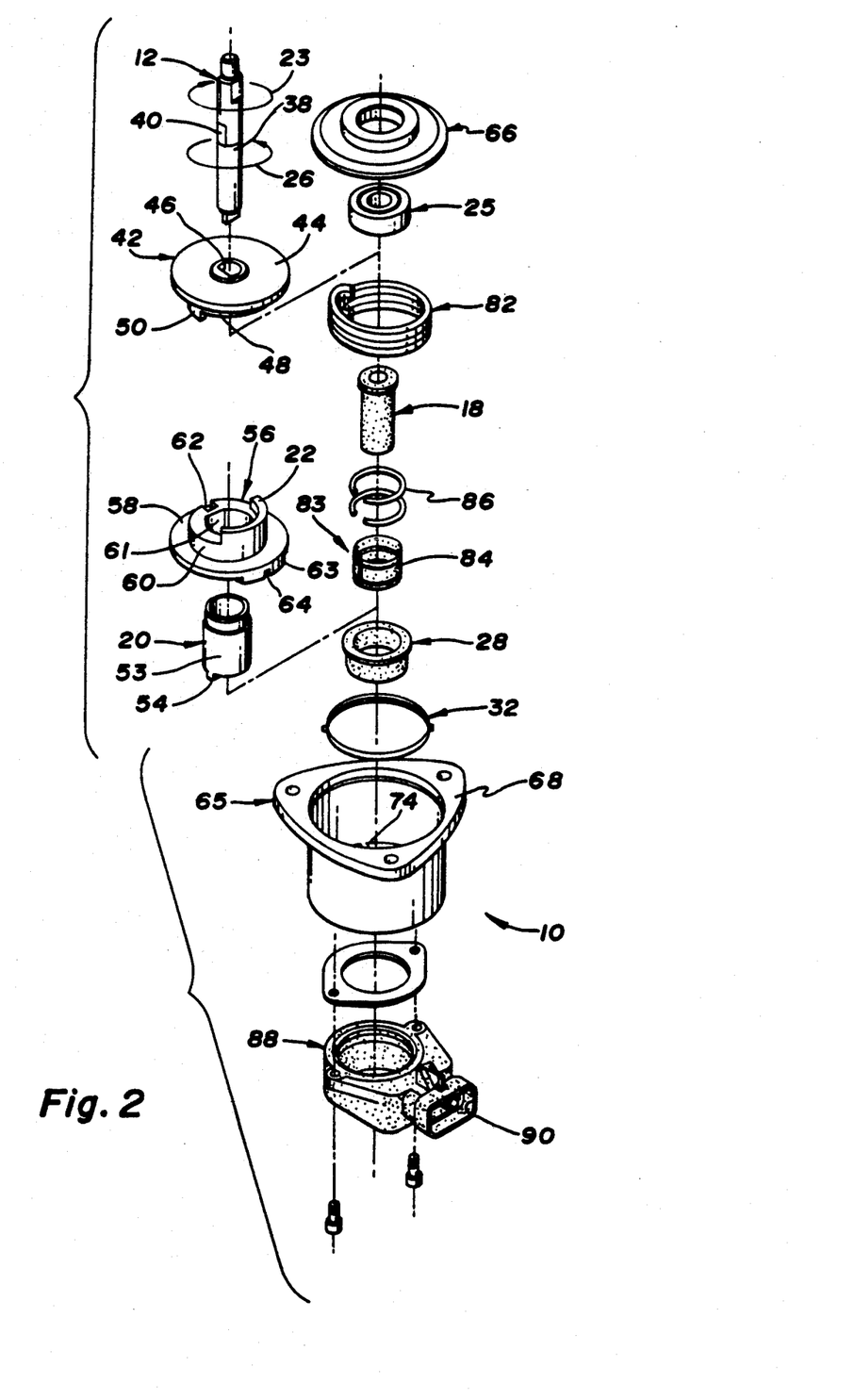
FIG. 2 is an exploded view of the remote control lever module of the present invention.
Figure 3:
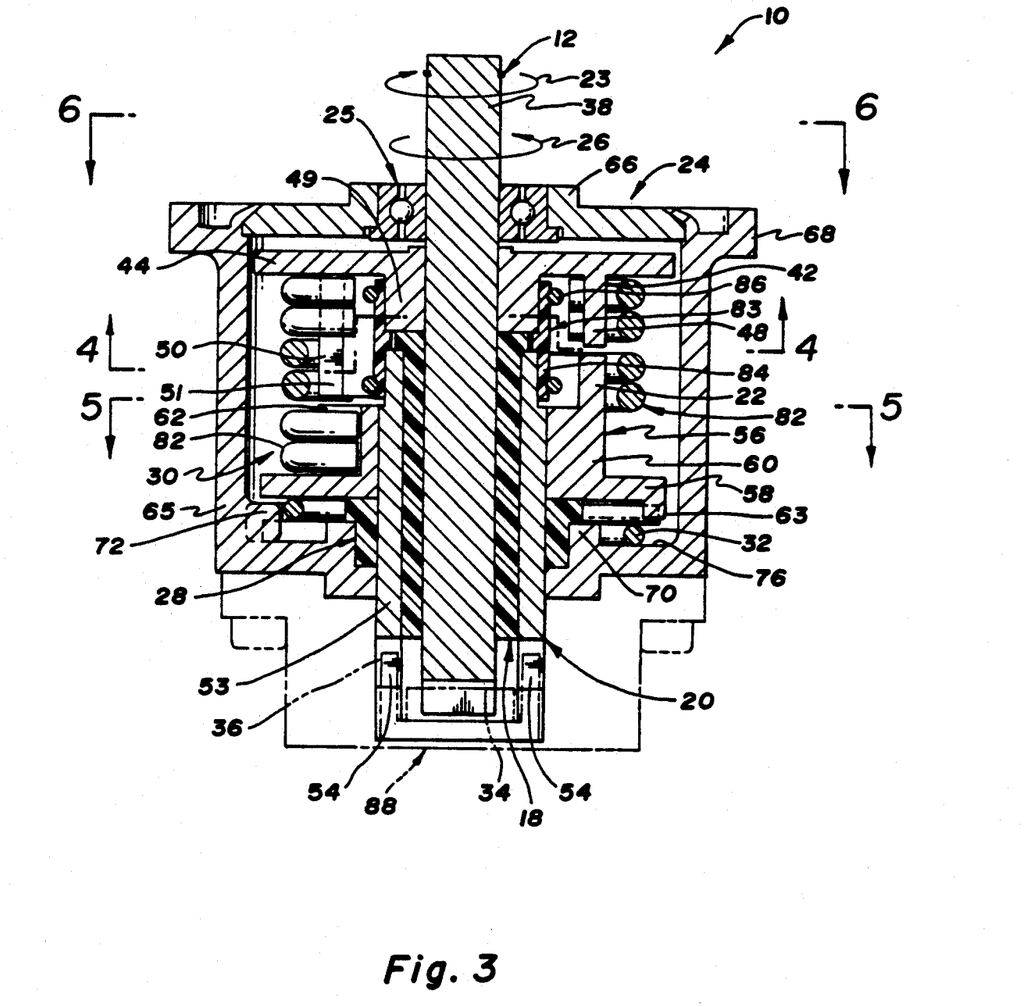
FIG. 3 is an enlarged cross sectional view of the lever module generally in the plane indicated by line 3—3 of FIG 1.

It is also possible for the outer shaft sensor 36 to comprise an annular member which concomitantly rotates with the outer shaft axle 53, as shown in FIG. 3, and a switch 92, as shown in FIGS. 7 and 8.

The inner shaft sensor 34 includes a cylindrical member concentric with the annular member of the outer shaft sensor 36 and longitudinally spaced apart from the support housing 65. The cylindrical member has radial detents which extend radially inward from its inner wall. The end of the inner shaft axle 38 extends into the cylindrical member between the radial detents so that rotation of the inner shaft causes the end of the inner shaft axle to engage the detents and produce concomitant rotation of the cylindrical member. A spring is connected to the cylindrical member to resist forward rotation 26 of the cylindrical member thereby causing the cylindrical member to backwardly rotate 23 concomitantly with the inner shaft axle 38.

The inner shaft sensor 34 preferably includes two inner shaft resistive sensor elements which are connected to the cylindrical member and concomitantly rotate with the inner shaft 12. Each inner shaft sensor element produces an output voltage proportional to the rotation of the inner shaft 12 with respect to the support housing 65. The two inner shaft sensor elements have opposite polarities so that when rotation of the inner shaft 12 causes the output voltage of one inner shaft sensor element to increase, the output voltage of the other inner shaft sensor element decreases by an equal amount. The output voltages of the two inner shaft sensor elements constitute the electrical position signal.

For the embodiment wherein the outer shaft sensor 36 includes an outer shaft sensor element which produces a force signal proportional to the rotation of the outer shaft 20, the voltage output of the outer shaft sensor element equals the voltage output of the inner shaft sensor having an inversed polarity when the outer shaft is in the nonactuating position. The change in the magnitude of the voltage output of the outer shaft sensor element is substantially greater than the change in the magnitude of the voltage output of each inner shaft sensor element, assuming equal angular displacements of the inner and outer shafts 12, 20.

The sensor housing 88 has electronic circuitry to which leads (e.g., the switch leads 93) from the inner and outer shaft sensors 34,36 extend. The electronic circuitry is electrically connected to a connector socket 90 adapted to receive a connector which is electrically connected to an electronic control system for the engine. The electronic circuitry in the sensor housing 88 facilitates forwarding of the position and force signals to the electronic control system via the connector in the connector socket 90. The electronic control system is able to read the position and force signals.

In operation, when the operator depresses the pedal 16, the inner shaft 12 forwardly rotates 26. The forward rotation 26 of the inner shaft 12 is transmitted to the outer shaft 20 via the return spring 82. The outer shaft 20 forwardly rotates 26 away from the nonactuating position causing the return stop 63 to disengage from the rear stop 78 of the return recess 76. After the outer shaft 20 has rotated 1.5 degrees, the return stop 63 engages the front stop 80 of the return recess 76 which obstructs further forward rotation 26 of the outer shaft 20 with the outer shaft being in the actuating position. During the forward rotation 26 of the outer shaft 20, the inner shaft 12 rotates very little with respect to the outer shaft 20 since the return spring 82 is substantially stiffer than the force spring 32.

Continued rotation of the inner shaft 12 by depression of the pedal 16 causes the inner shaft to forwardly rotate 26 away from the rearmost position with the inner shaft stop 50 disengaging from the outer shaft stop 22. The friction collar 83 resists relative rotation of the inner shaft 12 with respect to the outer shaft 20.

The inner and outer shaft sensors 34,36 measure the angular displacement of the inner and outer shafts, 12,20, respectively, with the degree of opening of the engine throttle valve normally being proportional to the angular displacement of the inner shaft 12.

When depression of the pedal 16 ceases, the return spring 82 urges the inner shaft collar 42 to backwardly rotate 23, with respect to the outer shaft 20, toward the rearmost position. When the inner shaft 12 reaches the rearmost position, the inner shaft stop 50 engages the outer shaft stop 22 preventing further backward rotation 23 of the inner shaft with respect to the outer shaft 20. The force spring 32 then urges the outer shaft collar 56 to backwardly rotate 23 from the actuating to nonactuating positions. The return spring 82 causes the backward rotation 23 of the outer shaft 20 to be transmitted to the inner shaft 12.

Deviations from the above sequence are sensed by the inner and outer shaft sensors 34,36 and detected by the electronic control system. Deviations can indicate that an examination of the lever module 10 is warranted.

The electronic control system is also able to detect inconsistencies between the output voltages produced by the inner shaft sensor elements of the inner shaft sensor 34. The opposite polarities of the inner shaft sensor elements, and the different rates at which the output voltages change, facilitate detection of some inconsistencies. Such inconsistencies can indicate that an examination of the lever module 10, and in particular, the inner shaft sensor 34, is warranted. The position signal also enables the electronic control system to detect the angular displacement of the inner shaft 12 and control the engine in accordance therewith.

The electronic control system is further able to detect inconsistencies between the actuating/nonactuating signals produced by an outer shaft sensor 36 comprising an annular member which concomitantly rotates with the outer shaft axle 53 and a switch 92. Such inconsistencies can indicate that an examination of the lever module 10, and in particular, the outer shaft sensor 36, is warranted.

It is possible to construct the lever module 10, 10a so that the maximum angular displacement of the inner shaft 12, 12a is less than the maximum angular displacement of the outer shaft 20, 20a, and the actuating arm 14, 14a is connected to the outer shaft and not the inner shaft. The degree of opening of the engine throttle valve would thereby be proportional to the angular displacement of the outer shaft 20, 20a.

Second Embodiment

FIGS. 9–13 show an alternative embodiment of the lever module 10b. Parts similar to those shown in FIGS. 1–8 have the same reference numeral with the addition of the suffix b. In this embodiment, inner shaft bearings 25b comprising sealed ball bearings support the inner shaft at opposite ends of the support housing 65b. The outer race of the upper inner shaft bearing 25b is held in the cover 66b by a press fit. The outer race of the lower inner shaft bearing 25b is held in the support housing 65b by a press fit. The inner diameters of the inner races of both inner shaft bearings 25b are larger than the cross sections of the respective portions of the inner shaft axle 38b which extend through them. Each inner shaft bearing 25b has a pair of annular rubber members which extend between the inner and outer races with one rubber member being above and the other rubber member being below the balls in the bearing.

Figure 9:
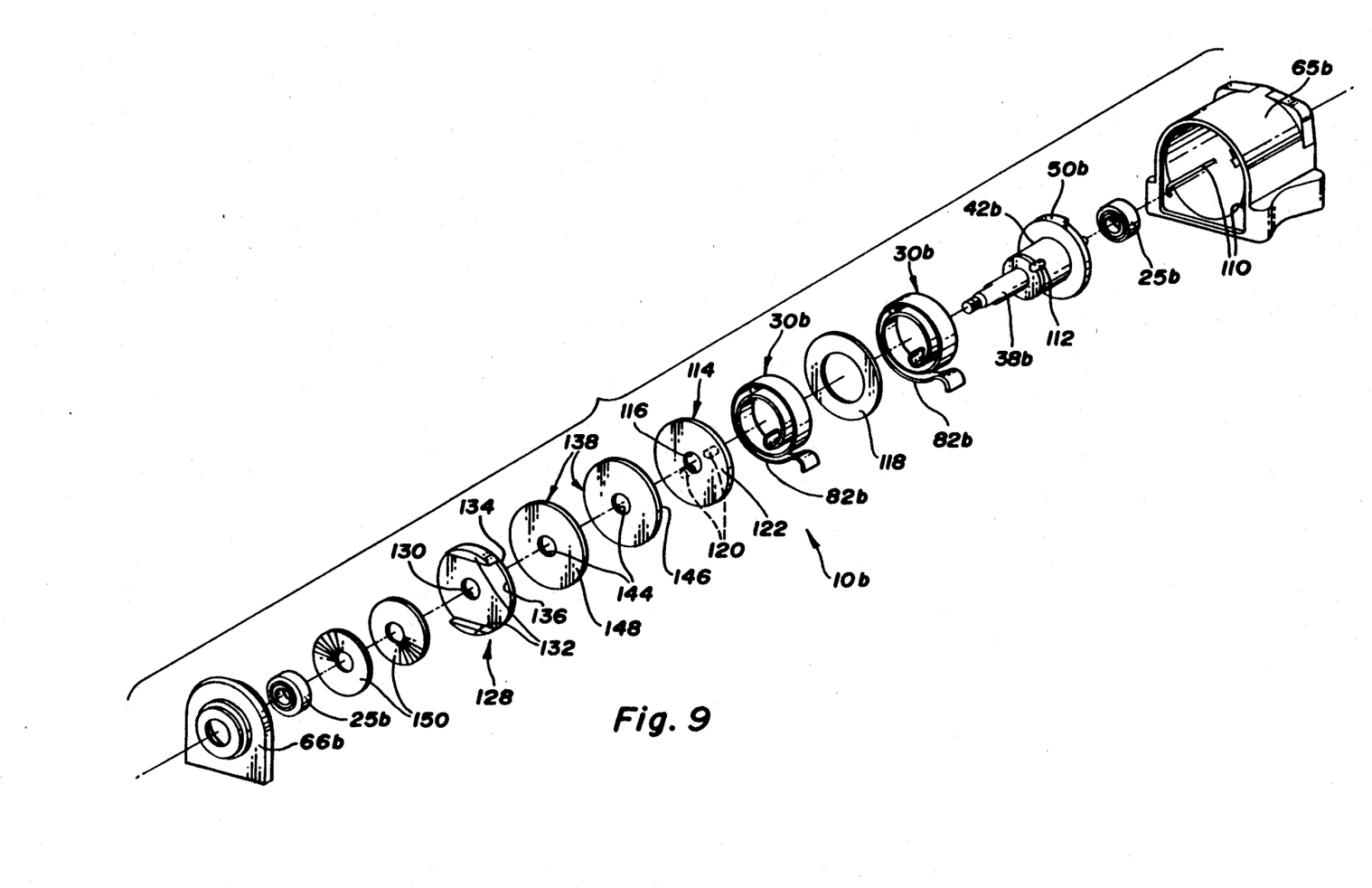
FIG. 9 is an exploded view of a second embodiment of the lever module.

The inner shaft 12b includes a stainless steel inner shaft axle 38b and a die cast aluminum inner shaft collar 42b. The inner shaft collar 42b is preferably insert molded around the inner shaft axle 38b, with the two parts being machined as a single assembly. The inner shaft collar 42b can alternatively be held to the inner shaft axle by a press fit. The inner shaft collar 42b has an annular flange portion 44b and a cylindrical axle portion 49b extending upward therefrom. The inner shaft collar 42b has an inner shaft stop 50b comprising an arcuate inner tab depending from the flange portion 44b. The inner shaft stop 50b defines a 152.5 degree arc. A longitudinal slot 51b extends through the inner shaft stop 50b and spacer portion 48b.

Figure 13:
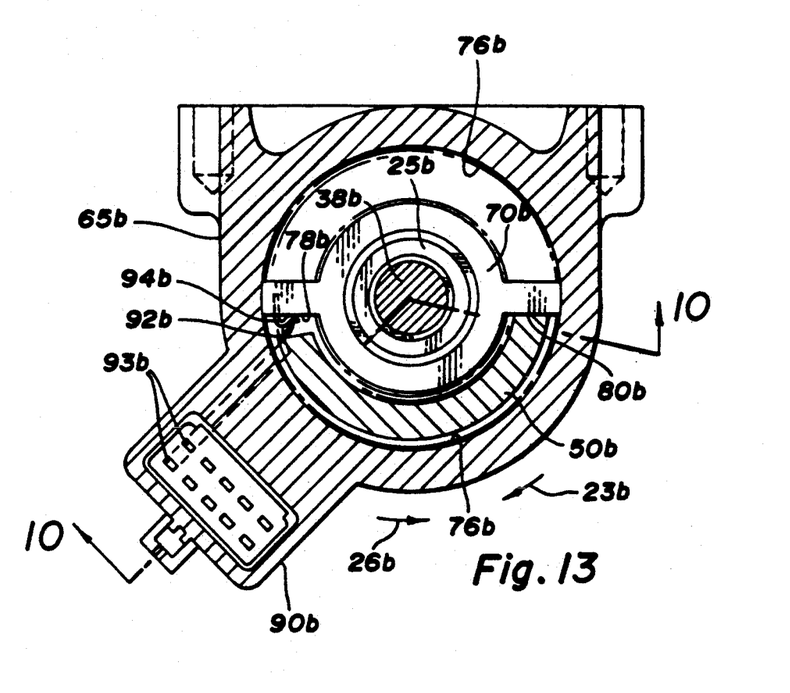
FIG. 13 is a sectional view of FIG. 10 in the plane indicated by the line 13—13 of FIG. 10 showing the arrangement of the components in the end of the support housing adjacent to the switch.

The return means 30b comprises a pair of arcuate return recesses 76b formed in the end of the support housing 65b adjacent to the sensor housing 88b, as shown in FIG. 13. Each return recess 76b defines a 180 degree arc. The inner shaft stop 50b extends into one of the return recesses 76b so that 27.5 degrees of rotational play is allowed between the inner shaft stop and support housing 65b.

Backward rotation of the inner shaft 10b, with respect to the support housing 65b, is limited by engagement of the inner shaft stop 50b with the rear end of the one return recess 76b which constitutes the rear stop 78b. The rearmost position is defined by the angular position of the inner shaft 10b when the inner shaft stop 50b engages the rear stop 78b of the return recess 76b. Forward rotation of the inner shaft 10b, with respect to the support housing 65b, is limited by engagement of the inner shaft stop 50b with the front end of the one return recess 76b which constitutes the front stop 80b. The actuating position is defined by the angular position of the inner shaft 10b when the inner shaft stop 50b is rotated away from the rear stop 78b.

Figure 10:
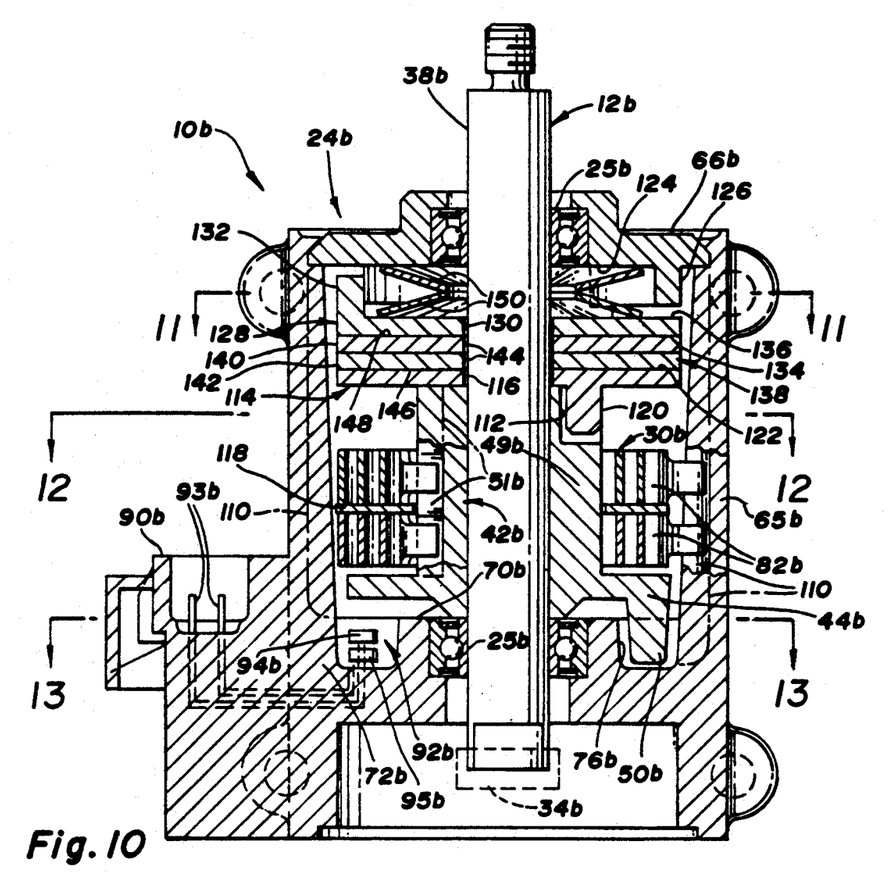
FIG. 10 is a view corresponding to FIG. 3 showing the second embodiment of the lever module, with parts being broken away to show the inner and outer tangs of the return spring 82b.
Figure 12:
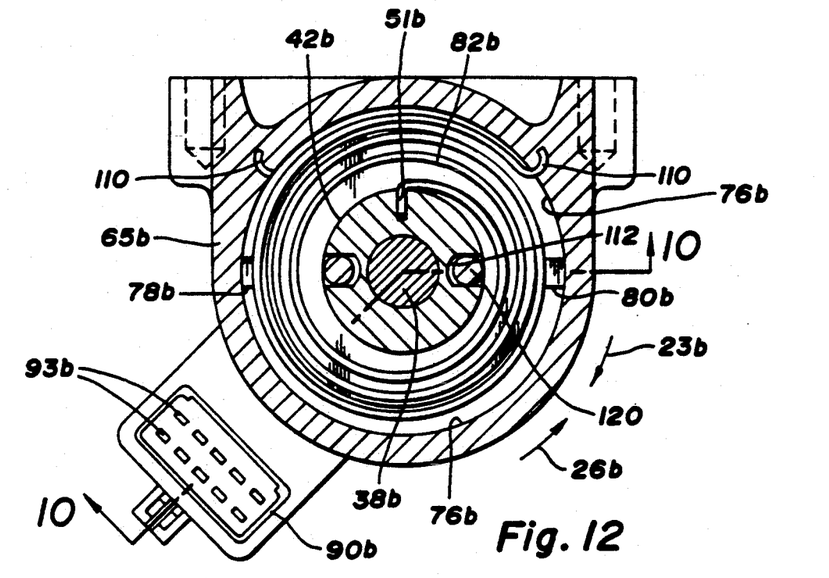
FIG. 12 is a sectional view of FIG. 10 in the plane indicated by the line 12—12 of FIG. 10 showing the engagement between the inner shaft collar and lower retainer, and the plane of the view shown in FIG. 10 indicated by line 10—10.

The return means 30b includes a return spring 82b comprising a pair of spirally wound flat metal strip springs, as shown in FIGS. 10 and 12. Each coil of the return spring 82b has an inner tang at one end which is inserted into the slot 51b in the inner shaft collar 42b to anchor the return spring to the inner shaft 12b. The return spring 82b encircles the inner shaft collar 42b when anchored to it. The other end of each coil of the return spring 82b has an outer tang which is inserted into a housing slot 110 in the support housing 65b to anchor the return spring thereto. The return means 30b includes a plastic or metal spring washer 118 disposed between the strip springs of the return spring 82b. The spring washer 118 has an axial opening which is larger than the portion of the inner shaft collar 42b which extends through it. The return spring 82b acts on the inner shaft 12b when it has forwardly rotated away from the rearmost position to urge the inner shaft toward the rearmost position. The support housing 65b has a second housing slot 110 in which the outer tang of the return spring 82b can be inserted enabling reversal of the directions of forward and backward rotation 26b,23b with respect to the support housing.

The end of the inner shaft collar 42b opposite to the sensor housing 88b has a pair of cylindrical collar keyways 112 with each collar keyway having an axis which is parallel to the inner shaft axle 38b, as shown in FIG. 12.

The inner shaft 12b includes a shaft retainer 114 comprising a disk which frictionally resists rubbing against an adjoining surface. Possible materials for the disk of the shaft retainer 114 include metal, plastic including phenolic and glass filled plastic, or materials similar to those used for conventional brake pads or clutch liners. The material of which the disk of the shaft retainer 114 is formed should have dimensional stability (i.e., be formable in accordance with precise specifications), high compressive strength, high coefficient of friction, and the ability to withstand high temperatures. Possible materials for the shaft retainer 114 includes Lexan 121 and Noryl 731 with 0%, 20% and 30% glass-fillings, powder metallurgy parts with or without EDM patterns, and coated metal parts.

The shaft retainer 114 has a shaft axial opening 116 through which the inner shaft axle 38b extends. The shaft axial opening 116 has a cross section which is larger than the cross section of the portion of the inner shaft axle 38b which extends through it. The shaft retainer 114 has a pair of downwardly extending collar pins 120 which extend into the collar keyways 112 to key the shaft retainer to the inner shaft collar 42b, as shown in FIGS. 10 and 12. The collar pins 120 are held in the collar keyways 112 by a press fit. Relative rotation between the shaft retainer 114 and inner shaft collar 42b is thereby obstructed. The shaft retainer 114 has a first retainer surface 122 opposite the collar pins 120 in a plane perpendicular to the axis of the inner shaft axle 38b.

The plastic cover 66b is staked to the one-piece plastic support housing 65b by vibration or sonic welding. The cover 66b includes an interior end surface 124 which has a pair of arcuate cover flanges 126 which extend inwardly along the axis of the inner shaft axle 38b, as shown in FIGS. 10 and 11.

The support means 24b includes a support member 128 comprising a disk formed of a material included in the group of possible materials described above for the disk of the shaft retainer 114. The support member 128 has a support axial opening 130 through which the inner shaft axle 38b extends. The support axial opening 130 has a cross section which is larger than the cross section of the portion of the inner shaft axle 38b which extends through it.

Figure 11:
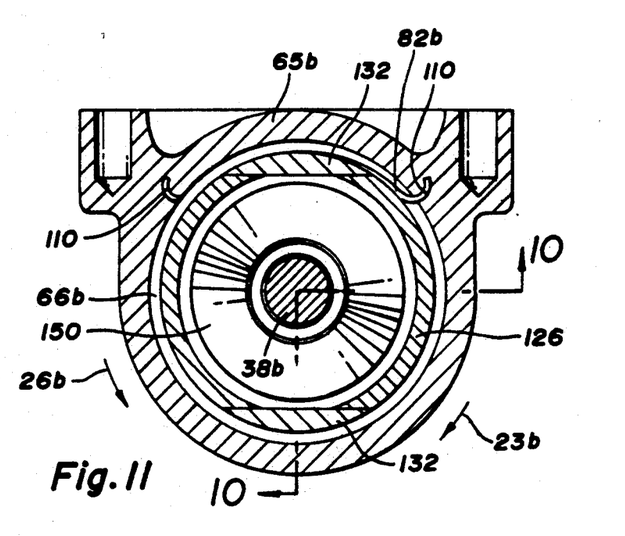
FIG. 11 is a sectional view of FIG. 10 in the plane indicated by the line 11—11 of FIG. 10 showing the engagement between the cover and upper retainer, and the plane of the view shown in FIG. 10 indicated by line 10—10.

The support member 128 has a pair of upwardly extending support pins 132 which extend into the spaces between the cover flanges 126, as shown in FIGS. 10 and 11. The cross section of each support pin 132 corresponds to space between the cover flanges 126 to key the support member 128 to the cover 66b. Relative rotation between the support member and cover 66b is thereby obstructed. Axial displacement of the support member 128 with respect to the cover 66b is allowed.

The support member 128 has a second retainer surface 134 which faces the first retainer surface 122 in a plane parallel thereto. The support member 128 has a spring surface 136 which faces the end surface 124 in a plane parallel thereto.

A friction pad 138 comprising upper and lower pads 140,142 is disposed between the shaft retainer 114 and support member 128. The upper and lower pads 140,142 are formed of a material included in the group of possible materials described above for the disk of the shaft retainer 114. The material of the upper pad 140 differs from the material of the second retainer surface 134 and the material of the lower pad 142, and the material of the lower pad 142 differs from the material of the first retainer surface 122. This arrangement, wherein different materials adjoin one another, may be achieved by forming the support member 128 and lower pad 142 of the same material, and the upper pad 140 and shaft retainer 114 of the same material, wherein the material of the upper pad 140 differs from the material of the lower pad 142. The materials of the upper and lower pads 140, 142, and the first and second retainer surfaces 122, 134 can be selected so that relative displacement between predetermined pairs of adjoining surfaces occurs when predetermined torques are applied to the inner shaft 12b, with the torque being proportional to the force applied to the pedal 16b.

The friction pad 138 has a pad axial opening 144 through which the inner shaft axle 38b extends. The pad axial opening 144 has a cross section which is larger than the cross section of the portion of the inner shaft axle 38b which extends through it. The friction pad 138 has a first friction surface 146 which engages the first retainer surface 122 and a second friction surface 148 which engages the second retainer surface 134.

The support member 128 includes a pair of washers comprising Belleville springs 150 having a back-to-back orientation with respect to one another disposed between the end and spring surfaces 124,136, as shown in FIG. 10. The Belleville springs 150 urge the support member 128 in the axial direction into engagement with the friction pad 138. This results in the friction pad 138 being resiliently compressed between the support member 128 and shaft retainer 118. The life and durability of the friction pad 138, support member 128 and shaft retainer 118 are inversely proportional to the compressive forces to which they are subjected. However, it is desirable for the compressive forces to be sufficiently large to maintain the friction pad 138, support member 128 and shaft retainer 118 in contact with one another since separation between them can allow them to vibrate.

A switch 92b is mounted on the rear stop 78b, as shown in FIGS. 10 and 13. The portion of the inner shaft stop 50b which engages the first and second contacts 94b,95b is electrically conductive so that contact between them enables an electrical current to flow between the first and second contacts via the inner shaft stop to produce the nonactuating signal. Thus, the sandwiching results in the switch 92b producing the nonactuating signal.

The electrical current flow is interrupted when the inner shaft 12b is forwardly rotated away from the rearmost position wherein the inner shaft stop 50b is disengaged from the first and second contacts 94b,95b. This causes the force switch 92b to produce the actuating signal.

An inner shaft sensor 34b is connected to the support means 24b and is adapted to produce an electrical signal proportional to the angular displacement of the inner shaft 12b with respect to the support means. The inner shaft sensor 34b preferably includes two inner shaft sensor elements, as described above with respect to inner shaft sensor 34.

In operation, when the operator depresses the pedal 16b, the inner shaft 12b forwardly rotates 26b away from the rearmost position causing the inner shaft stop 50b to disengage from the force switch 92b. The friction pad 138 resists relative rotation of the inner shaft 12b with respect to the support means 24b. The inner shaft sensor 34b produces a position signal proportional to the angular displacement of the inner shaft 12b. The position signal is detected by the electronic control system which normally controls the engine in accordance with the position signal. The force switch 92b produces an actuating signal when the inner shaft stop 50b is disengaged from it.

When depression of the pedal 16b ceases, the return spring 82b urges the inner shaft collar 42b to backwardly rotate 23 toward the rearmost position. When the inner shaft 12b reaches the rearmost position, the inner shaft stop 50b engages the force switch 92b. The switch 92b produces a nonactuating signal when the inner shaft stop 50b is engaged with it.

The actuating/nonactuating signal produced by the switch 92b is also detected by the electronic control system. Inconsistencies between the actuating/nonactuating and position signals can indicate that an examination of the lever module 10b is warranted. Also, inconsistencies between the output voltages produced by the two inner shaft sensor elements can indicate that an examination of the lever module 10, and in particular, the inner shaft sensor 34b, is warranted.

Alternative embodiments of the lever module 10,10a,10b can also be used with a vehicle driven by an electric motor instead of an engine wherein the electric signals produced by the inner shaft sensor 34,34a,34b, outer shaft sensor 36 and switches 92,92b are used to control the output of the electric motor. Moreover, the lever module 10,10a,10b can be used in other applications to sense the movement of a lever.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

The embodiments of the invention in which an exclusive property or privilege is claimed are defined as follows:

1. A remote control lever module comprising:
   a lever including an inner shaft, and an actuating arm extending from said inner shaft at an angle thereto;
   an intermediate bearing coaxially surrounding a portion of said inner shaft;
   an outer shaft coaxially surrounding a portion of said intermediate bearing enabling relative rotation between said inner and outer shafts, said outer shaft having an outer shaft stop engageable with said inner shaft to limit rotation in a backward direction of said inner shaft with respect to said outer shaft when said inner shaft is in a rearmost position;
   a support means including an inner shaft bearing which pivotably supports said inner shaft so that, displacement of said actuating arm causes said inner shaft to rotate in a forward or backward direction about its axis, and an outer shaft bearing which pivotably supports said outer shaft enabling said outer shaft to forwardly or backwardly rotate about its axis;
   a return means engageable with said inner and outer shafts enabling forward rotation of said inner shaft to cause forward rotation of said outer shaft, said return means further enabling forward rotation of said inner shaft to cause forward rotation of said inner shaft away from said rearmost position, said return means being adapted to urge said inner shaft toward said rearmost position when said inner shaft has forwardly rotated away from said rearmost position, said return means limiting backward rotation of said outer shaft beyond a nonactuating position, said engagement between said inner shaft and outer shaft stop limiting backward rotation of said inner shaft beyond said nonactuating position;
   a force spring having one end anchored to said outer shaft and another end anchored to said support means, said force spring being adapted to urge said outer shaft toward said nonactuating position when said outer shaft has forwardly rotated away from said nonactuating position, said force spring being sufficiently yielding so that forward rotation of said inner shaft causes forward rotation of said outer shaft;

an inner shaft sensor connected to said support means and engageable with said inner shaft, said inner shaft sensor being adapted to produce an electrical position signal proportional to the angular displacement of said inner shaft with respect to said support means; and an outer shaft sensor connected to said support means and engageable with said outer shaft, said outer shaft sensor being adapted to produce an electrical nonactuating signal when said outer shaft is in said nonactuating position and an electrical actuating signal when said outer shaft is forwardly rotated away from said nonactuating position.

2. A remote control lever module as set forth in claim 1 wherein said return means comprises a return spring having one end anchored to said inner shaft and another end anchored to said outer shaft, said return spring being adapted to urge forward rotation of said outer shaft when said inner shaft is forwardly rotated, said return means further comprising a return stop connected to said outer shaft and engageable with said support means to limit forward rotation of said outer shaft beyond an actuating position, said return spring being sufficiently yielding so that, when said outer shaft is in said actuating position, said return spring allows forward rotation of said inner shaft away from said rearmost position, said return spring acting on said inner shaft when it has forwardly rotated away from said rearmost position to urge said inner shaft toward said rearmost position.

3. A remote control lever module as set forth in claim 1, and further comprising a friction collar gripping said inner and outer shafts to frictionally resist relative rotation between said inner and outer shafts.

4. A remote control lever module as set forth in claim 1 in combination with an electronic control system for a vehicle wherein said support means is attached to the vehicle so that it is stationary with respect to the seat of the driver, said actuating arm having a pedal connected thereto enabling said actuating arm to be actuated by a driver stepping on the pedal.

5. A remote control lever module as set forth in claim 1 wherein said outer shaft sensor is rotatably connected to said outer shaft.

6. A remote control lever module as set forth in claim 5 wherein said outer shaft sensor is further adapted to produce an electrical signal proportional to the angular displacement of said outer shaft with respect to said support means.

7. A remote control lever module as set forth in claim 1 wherein said return means comprises a rear stop formed on said support means so that said outer shaft engages said rear stop when said outer shaft is in said nonactuating position, and wherein said outer shaft sensor comprises a switch mounted on said rear stop so that, when said outer shaft is in said nonactuating position, said switch is sandwiched between said rear stop and said outer shaft, said switch being adapted so that said sandwiching causes said switch to produce said nonactuating signal, said switch being sized so that, when said outer shaft is forwardly rotated away from said nonactuating position, said outer shaft is disengaged from said switch, said switch being adapted so that said disengagement causes said switch to produce said actuating signal.

8. A remote control lever module as set forth in claim 7 wherein said switch comprises first and second electrical contacts extending from said rear stop, said outer shaft engaging said first and second contacts when said outer shaft is in said nonactuating position, the portion of said outer shaft which engages said first and second contacts being electrically conductive so that contact between them enables an electrical current to flow between said first and second contacts via said outer shaft to produce said nonactuating signal, said electrical current flow being interrupted when said outer shaft is in said actuating position wherein said outer shaft is disengaged from said first and second contacts thereby causing said switch to produce said actuating signal.

9. A remote control lever module as set forth in claim 8 wherein said first contact is resilient and extends further away from said rear stop than said second contact so that when said outer shaft backwardly rotates toward said rear stop, said outer shaft initially engages said first contact causing it to deflect thereby enabling said outer shaft to backwardly rotate further into engagement with said second contact thereby enabling said outer shaft to engage said second contact so that said outer shaft engages said first and second contact ends when in said nonactuating position.

10. A remote control lever module comprising:
a lever including an inner shaft, and an actuating arm extending from said inner shaft at an angle thereto;

a support means including an inner shaft bearing which pivotably supports said inner shaft so that, displacement of said actuating arm causes said inner shaft to rotate in a forward or backward direction about its axis;

a return means including a rear stop formed on said support means, said inner shaft being engageable with said rear stop to limit backward rotation of said inner shaft beyond a rearmost position, said return means being adapted to urge said inner shaft toward said rearmost position when said inner shaft has forwardly rotated away from said rearmost position;

an inner shaft sensor connected to said support means and engageable with said inner shaft, said inner shaft sensor being adapted to produce an electrical position signal proportional to the angular displacement of said inner shaft with respect to said support means; and a switch mounted on said rear stop so that, when said inner shaft is in said rearmost position, said switch is sandwiched between said rear stop and inner shaft, said force switch being adapted so that said sandwiching causes said force switch to produce an electrical nonactuating signal, said switch being sized so that, when said inner shaft is forwardly rotated away from said rearmost position, said inner shaft is disengaged from said switch, said switch being adapted so that said disengagement causes said switch to produce an electrical actuating signal.

11. A remote control lever module as set forth in claim 10 wherein said switch comprises first and second electrical contacts extending from said rear stop, said inner shaft engaging said first and second contacts when said inner shaft is in said rearmost position, the portion of said inner shaft which engages said first and second contacts being electrically conductive so that contact between them enables an electrical current to flow between said first and second contacts via said inner shaft to produce said nonactuating signal, said electrical current flow being interrupted when said inner shaft is forwardly rotated away from said rearmost position wherein said inner shaft is disengaged from said first and second contacts thereby causing said switch to produce said actuating signal.

12. A remote control lever module as set forth in claim 11 wherein said first contact is resilient and extends further away from said rear stop than said second contact so that when said inner shaft backwardly rotates toward said rear stop, said inner shaft initially engages said first contact causing it to deflect thereby enabling said inner shaft to backwardly rotate further into engagement with said second contact thereby enabling said inner shaft to engage said second contact so that said inner shaft engages said first and second contacts ends when in said rearmost position.

13. A remote control lever module as set forth in claim 10 in combination with an electronic control system for a vehicle wherein said support means is attached to the vehicle so that it is stationary with respect to the seat of the driver, said actuating arm having a pedal connected thereto enabling said actuating arm to be actuated by a driver stepping on the pedal.

14. A remote control lever module comprising:
a lever including an inner shaft, and an actuating arm extending from said inner shaft at an angle thereto;
a support means including an inner shaft bearing which pivotably supports said inner shaft so that, displacement of said actuating arm causes said inner shaft to rotate in a forward or backward direction about its axis, said support means including a support member which is fixed to said support means during at least a portion of said rotation of said inner shaft;
a return means engageable with said inner shaft to limit backward rotation of said inner shaft beyond a rearmost position, said return means being adapted to urge said inner shaft toward said rearmost position when said inner shaft has forwardly rotated away from said rearmost position;
a friction pad disposed between said inner shaft and said support member, said friction pad being adapted to rotate about the axis of said inner shaft with respect to said inner shaft and support member, said friction pad having a first friction surface in engagement with said inner shaft to frictionally resist relative displacement between said friction pad and said inner shaft, said friction pad having a second friction surface in engagement with said support member, said second friction surface frictionally resisting relative displacement between said friction pad and said support member; and
an inner shaft sensor connected to said support means and engageable with said inner shaft, said inner shaft sensor being adapted to produce an electrical position signal proportional to the angular displacement of said inner shaft with respect to said support means.

15. A remote control lever module as set forth in claim 14 wherein the portion of said friction pad which constitutes said first friction surface is formed of a first material, the portion of said inner shaft which engages said first friction surface is formed of a second material, said first material differing from said second material.

16. A remote control lever module as set forth in claim 14 wherein the portion of said friction pad which constitutes said second friction surface is formed of a first material, the portion of said support member which engages said second friction surface is formed of a second material, said first material differing from said second material.

17. A remote control lever module as set forth in claim 14 wherein said support member has an annular shape, said support member being coaxial with said inner shaft, and said friction pad comprises a friction collar coaxially surrounding said inner shaft and support member, the portions of said friction collar in engagement with said inner shaft and support member constituting said first and second friction surfaces, respectively, said friction collar being adapted to resiliently grasp said inner shaft and support member to cause said frictional resistance.

18. A remote control lever module as set forth in claim 14 wherein said inner shaft includes a shaft retainer keyed thereto so that said shaft retainer rotates concomitantly with said inner shaft, said shaft retainer having a first retainer surface in a plane perpendicular to the axis of said inner shaft;
said support member having a second retainer surface which faces said first retainer surface in a plane parallel thereto, said support member being keyed to said support means to obstruct rotation of said second retainer surface about said inner shaft with respect to said support means;
said friction pad comprising a disk having a pad axial opening through which said inner shaft extends, said pad axial opening having a cross section which is larger than the cross section of the portion of said inner shaft which extends through it, said friction pad being disposed between said shaft retainer and support member so that said first friction surface engages said first retainer surface and said second friction surface engages said second retainer surface;
said shaft retainer and support member being adapted to resiliently compress said friction pad to cause said frictional resistance.

19. A remote control lever module as set forth in claim 17 wherein said inner shaft is adapted to obstruct displacement of said shaft retainer away from said friction pad in said axial direction, said support means including an end surface which faces said support member in a plane perpendicular to the axis of said inner shaft, said support member comprising a disk having a support axial opening through which said inner shaft extends, said support axial opening having a cross section which is larger than the cross section of the portion of said inner shaft which extends through it, said support member further comprising a spring surface which faces said end surface in a plane parallel thereto, said support member further comprising a Belleville spring disposed between said end and spring surfaces to urge said support member into engagement with said friction pad so that said friction pad is resiliently compressed.

20. A remote control lever module as set forth in claim 14 in combination with an electronic control system for a vehicle wherein said support means is attached to the vehicle so that it is stationary with respect to the seat of the driver, said actuating arm having a pedal connected thereto enabling said actuating arm to be actuated by a driver stepping on the pedal.

21. A remote control lever module comprising:
a lever including an inner shaft, and an actuating arm extending from said inner shaft at an angle thereto;

a support means including an inner shaft bearing which pivotably supports said inner shaft so that, displacement of said actuating arm causes said inner shaft to rotate in a forward or backward direction about its axis;

a return means engageable with said inner shaft to limit backward rotation of said inner shaft beyond a rearmost position, said return means being adapted to urge said inner shaft toward said rearmost position when said inner shaft has forwardly rotated away from said rearmost position;

a friction pad disposed between said inner shaft and said support means, said friction pad having a first friction surface in engagement with said inner shaft to frictionally resist relative displacement between said friction pad and said inner shaft;

a Belleville spring disposed between said support means and friction pad to urge said friction pad into engagement with said inner shaft to cause said frictional resistance; and an inner shaft sensor connected to said support means and engageable with said inner shaft, said inner shaft sensor being adapted to produce an electrical position signal proportional to the angular displacement of said inner shaft with respect to said support means.

22. A remote control lever module as set forth in claim 21 in combination with an electronic control system for a vehicle wherein said support means is attached to the vehicle so that it is stationary with respect to the seat of the driver, said actuating arm having a pedal connected thereto enabling said actuating arm to be actuated by a driver stepping on the pedal.

* * * * *